United States Patent
Sakamoto

(10) Patent No.: US 6,172,438 B1
(45) Date of Patent: *Jan. 9, 2001

(54) TWO-PHASE PERMANENT-MAGNET ELECTRIC ROTATING MACHINE

(75) Inventor: Masafumi Sakamoto, Kiryu (JP)

(73) Assignee: Japan Servo Company, Ltd., Tokyo-to (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/046,666

(22) Filed: Mar. 25, 1998

Related U.S. Application Data

(63) Continuation of application No. 08/633,060, filed on Apr. 16, 1996.

(30) Foreign Application Priority Data

Apr. 19, 1995 (JP) .................................................. 7-116621

(51) Int. Cl.$^7$ .................................................. H02K 21/12
(52) U.S. Cl. ........................................ 310/156; 310/49 R
(58) Field of Search ..................................... 310/156, 216, 310/254, 258, 265, 261, 262; 29/596, 598

(56) References Cited

U.S. PATENT DOCUMENTS

| | | | |
|---|---|---|---|
| 3,803,433 | * | 4/1974 | Ingenito .............................. 310/156 |
| 3,860,843 | * | 1/1975 | Kawasake et al. ..................... 310/67 |
| 3,914,629 | * | 10/1975 | Gardiner ................................. 310/46 |
| 4,672,253 | * | 6/1987 | Tajima et al. ......................... 310/269 |
| 4,704,567 | * | 11/1987 | Suzuki et al. ......................... 318/254 |
| 4,748,362 | * | 5/1988 | Hedlund ................................ 310/168 |
| 4,874,975 | * | 10/1989 | Hertrich ................................ 310/186 |
| 4,882,511 | * | 11/1989 | Von Der Heide .................. 310/67 R |
| 4,890,024 | * | 12/1989 | Hashimoto et al. ............... 310/49 R |
| 4,987,329 | * | 1/1991 | Schmidt et al. ..................... 310/156 |
| 4,998,032 | * | 3/1991 | Burgbacher ............................ 310/51 |
| 5,041,749 | * | 8/1991 | Gaser et al. ......................... 310/156 |
| 5,111,096 | * | 5/1992 | Horst .................................... 310/168 |
| 5,280,209 | * | 1/1994 | Leupold et al. ...................... 310/156 |
| 5,298,827 | * | 3/1994 | Sugiyama ............................ 310/156 |
| 5,386,161 | * | 1/1995 | Sakamoto .......................... 310/49 R |

* cited by examiner

Primary Examiner—Nestor Ramirez
Assistant Examiner—Tran N Nguyen
(74) Attorney, Agent, or Firm—Oblon, Spivak, McClelland, Maier & Neustadt, P.C.

(57) ABSTRACT

A two-phase permanent-magnet electric rotating machine in which vibration and noise are less is provided. The machine is constituted by: a stator having $2^n$ main poles ($\underline{n}$ being an integer satisfying $n \geq 2$) each of which has at its end portion a predetermined number of magnetic teeth and has a winding provided thereon; and a rotor having permanent magnets formed so that N (north) and S (south) equal in number of the permanent magnets are alternately disposed in a direction of rotation of the rotor; wherein $2^{(n-1)}$ alternate ones of the main poles are made to be in-phase and a half ones of the in-phase main oles have a polarity which is opposite to a polarity of the other ones. It is preferable to make the number of the magnetic pole pairs of N and S of the rotor be $4m \pm 1$ ($\underline{m}$ being an integer satisfying $m \geq 1$) when the value $\underline{n}$ is set to 2. It is preferable to form the windings so that the in-phase main poles of the stator are made to be alternately inverted in polarity.

4 Claims, 7 Drawing Sheets

TWO-PHASE PERMANENT-MAGNET ELECTRIC ROTATING MACHINE

This application is a continuation of application Ser. No. 08/633,060, filed on Apr. 16, 1996.

BACKGROUND OF THE INVENTION

1. Field of the Invention

The present invention relates to a permanent-magnet electric rotating machine, and particularly relates to a two-phase permanent-magnet electric rotating machine low in cost and adapted for use in office automation appliances such as copying machines, facsimiles, or the like, which require relatively accurate positioning functions, or the like, with low noise and low vibration.

2. Description of Prior Art

As conventional electric rotating machines for use in office automation appliances which do not require high accurate positioning functions specially, two-phase permanent-magnet electric rotating machines which can be produced at a low cost are widely used of the two-phase permanent-magnet electric rotating machines, a hybrid type permanent-magnet electric rotating machine is generally used because the characteristic of a small step angle is obtained with high accuracy and high torque.

FIGS. 8A and 8B conceptually show an example of the main structure of a conventional two-phase four-pole hybrid type permanent-magnet electric rotating machine. In FIGS. 8A and 8B, the details of a housing, rotor shaft bearings and windings and lead wires, and so on, are not shown. FIG. 8A is a front view of the electric rotating machine, and FIG. 8B is a section taken along the line VIIIB—VIIIB in FIG. 8A.

In FIGS. 8A and 8B, the reference numeral 1' designates an annular yoke portion of a stator iron core. Four main poles 1'-1 to 1'-4 are formed at circumferentially equal pitches so as to project centripetally toward the inside of the yoke 1'. Excitation windings 2'-1 to 2'-4 for performing magnetization in predetermined timing are provided on the four main poles 1'-1 to 1'-4, respectively.

Magnetic teeth 1'a of the number corresponding to the structural characteristic of the electric rotating machine are formed at circumferentially equal intervals on each of the main poles 1'-1 to 1'-4.

A rotating shaft $3''$ is rotatably supported by shaft bearings (not shown) provided in a center portion of a housing (not shown). An axially magnetized permanent magnet 4' is fixedly provided on the rotating shaft 3'. The permanent magnet 4' is sandwiched between two disc-like rotor magnetic poles 5'A and 5'B. Magnetic teeth 5'a are formed on the outer circumference of each of the rotor magnetic poles 5'A and 5'B so as to be arranged with a shape and pitch corresponding to the shape and pitch of the magnetic teeth 1'a formed on the stator main poles. The magnetic teeth 5'a of the first rotor magnetic pole 5'A are coupled with the magnetic teeth 5'a of the second rotor magnetic pole 5'B with a relative displacement in the direction of rotation by a half pitch.

In the electric rotating machine configured as described above, the respective magnetic teeth 1'a of the stator are magnetized successively in the direction of rotation by supply of an electric current to the stator windings 2'-1 to 2'-4 in a predetermined sequence and in a predetermined direction.

In FIGS. 8A and 8B, the symbol N (north) written in the stator main pole 1'-1 and the symbol S (south) written in the stator main pole 1'-3 show magnetic polarities generated when excitation currents are made to pass through the windings 2'-1 and 2'-3 in certain timing, respectively. The symbols N (north) and S (south) written in the magnetic teeth 5'a in FIG. 8A and written in the first and second rotor magnetic poles 5'A and 5'B in FIG. 8B show an example of polarities of rotor magnetic poles magnetized by the permanent magnet 4', respectively.

That is, in the timing shown in FIGS. 8A and 8B, the magnetic teeth 1'a of the main pole 1'-1 and the magnetic teeth 5'a of the first rotor magnetic pole 5'A are attracted to each other, and the magnetic teeth 1'a of the main pole 1'-3 and the magnetic teeth 5'a of the second rotor magnetic pole 5'B are attracted to each other.

By the aforementioned action, the rotor is rotated or stopped by means of the interaction between the stator magnetic teeth 1'a magnetized in the direction of rotation and the rotor magnetic teeth 5'a magnetized by the permanent magnet 4'.

In the aforementioned conventional two-phase hybrid type permanent-magnet electric rotating machine, the first rotor magnetic pole 5'A and the second rotor magnetic pole 5'B are attracted upward and downward, respectively, in the drawing as represented by the arrows in the excitation timing shown in FIG. 8B, so that imbalance force acts on the rotating shaft 3' as shown in FIG. 8B. Accordingly, as the excitation of the respective main poles of the stator rotates, the rotor vibrates to thereby generate noise while it is rotating, because there is a clearance between the rotating shaft 3' and the outer or inner wheel of the not-shown shaft bearings.

That is, of the two-phase permanent-magnet electric rotating machines, such a generally used hybrid type electric rotating machine is low in cost and high in accuracy but has a problem in that vibration as well as noise are large.

An object of the present invention is to solve the aforementioned problems in the prior art, that is, to provide a two-phase permanent-magnet electric rotating machine which is low in vibration as well as noise and which can be produced at a low cost and in a small size.

SUMMARY OF THE INVENTION

In order to achieve the above object, according to a first aspect of the present invention, the two-phase permanent-magnet electric rotating machine comprises: a stator having $2^n$ main poles (n being an integer satisfying a condition $n \geq 2$) provided circumferentially so as to project inward centripetally from an inner circumferential surface of a substantially annular magnetic body, the stator having exciting windings wound on the main poles respectively, each of the main poles having on its end portion a predetermined number of magnetic teeth; and a cylindrical rotor having a plurality of permanent magnets formed in a manner so that N (north) and S (south) poles equal in number of the permanent magnets are alternately circumferentially disposed, the rotor being supported so as to be rotatable relative to the stator with a predetermined air gap between surfaces of the main poles and surfaces of the permanent magnets; wherein the main poles are arranged in a manner so that $2^{(n-1)}$ alternate ones of the main poles are made to be in-phase and that a half of the in-phase main poles have a polarity which is opposite to a polarity of the other half of the in-phase main poles.

Preferably, in the above two-phase permanent-magnet electric rotating machine, the value of n of the $2^n$ main poles is 2 and the number of the magnetic pole pairs of N and S of the rotor is 4m±1 (m being an integer satisfying a condition m≧1).

Preferably, in the above two-phase permanent-magnet electric rotating machine, a back yoke formed from a magnetic substance is provided on the permanent magnet rotor on its one side opposite to its other side facing the stator, and the windings and connections thereof are formed in a manner so that the in-phase main poles of the stator are made alternately different from each other in polarity.

According to a second aspect of the present invention, the inner-rotor or outer-rotor type two-phase permanent-magnet electric rotating machine comprises: a stator including a stator iron core made from a magnetic substance in a predetermined shape having a disc portion and $2^n$ main poles (n being an integer satisfying a condition n≧2) erected perpendicularly from the outer circumference of the disc portion, and excitation windings each formed to have a predetermined width, the excitation windings being provided on the main poles respectively in a manner so that at least one end portion of each of the main poles projecting out of the winding is shaped like a predetermined number of comb teeth; and a cylindrical rotor having a plurality of permanent magnets formed in a manner so that N (north) and S (south) poles equal in number of the permanent magnets are alternately disposed in a direction of rotation of the rotor, the rotor being supported so as to be rotatable relative to the stator with a predetermined air gap between surfaces of the main poles and surfaces of the permanent magnets; wherein the main poles are arranged in a manner so that $2^{(n-1)}$ alternate ones of the main poles are made to be in-phase and that a half of the in-phase main poles have a polarity which is opposite to a polarity of the other half of the in-phase main poles.

Preferably, in the above inner-rotor or outer-rotor type two-phase permanent-magnet electric rotating machine, the value of n of the $2^n$ main poles is 2 and the number of the magnetic pole pairs of N and ' of the rotor is 4m±1 (m being an integer satisfying a condition m≧1).

Preferably, in the above inner-rotor or outer-rotor type two-phase permanent-magnet electric rotating machine, a back yoke formed from a magnetic substance is provided on the permanent magnet rotor on its one side opposite to its other side facing the stator, and the windings and connections thereof are formed in a manner so that the in-phase main poles of the stator are made alternately different from each other in polarity.

According to a third aspect of the present invention, the inner-rotor or outer-rotor type two-phase permanent-magnet electric rotating machine comprises: a stator having windings wound in a direction perpendicular to an axial direction of rotation, and main poles made from a magnetic substance and being $2^n$ in total number for two phases (n being an integer satisfying a condition n ≧2), each of the main poles having two end portions which are fitted parallelly to the axial direction of rotation into corresponding one of the windings so that the two end portions are engaged with each other with a predetermined gap therebetween to thereby form a comb teeth portion; and a rotatably supported cylindrical rotor having a plurality of permanent magnets formed in a manner so that N (north) and S (south) poles equal in number of the permanent magnets are alternately disposed in a direction of rotation of the rotor so as to face the comb teeth portions of the main poles of the stator with a predetermined air gap therebetween; wherein the main poles are arranged in a manner so that $2^{(n-1)}$ alternate ones of the main poles are made to be in-phase.

Preferably, in the above inner-rotor or outer-rotor type two-phase permanent-magnet electric rotating machine according to the third aspect, each of the main poles may have a halved structure and each of the main poles is coupled with adjacent ones of the main poles through thin magnetically saturated magnetic bodies.

According to the first aspect of the present invention, when the main poles of the stator are excited to attract the permanent magnets of the rotor, imbalance electromagnetic force is not generated because respective attraction forces are equal in degree and canceled with each other in a plane perpendicular to the rotating shaft.

Further, assuming now that the value n of the $2^n$ main poles is 2 and that the number of the rotor pole pairs is 4m±1 (m being an integer satisfying m ≧1), then N and S poles are generated in 180°-reverse direction of the one-phase excited stator so that the stator main poles magnetized to the N poles attract the S poles of the rotor and the stator main poles magnetized to the S poles attract the N poles of the rotor.

Accordingly, the attraction forces are equal in degree but reverse in direction and canceled with each other in a plane perpendicular to the rotating shaft, so that no imbalance electromagnetic force is generated.

Accordingly, vibration as well as noise generated in the prior art are not generated. When a back yoke formed from a magnetic substance is provided in the inside of the permanent magnets formed in the rotor, efficiency is improved more greatly because the magnetic reluctance of a magnetic circuit can be reduced.

In the aforementioned configuration, a balanced rotating magnetic field is obtained when windings are formed so that the in-phase main poles of the stator are made alternately different in polarity from each other.

According to the second and third aspects of the present invention, the functional characteristic of the two-phase permanent-magnet electric rotating machine similar to the first aspect can be obtained by a simple structure. When the electric rotating machine is provided so as to be of an outer-rotor type, the size can be reduced because the stator can be included in the inside of the rotor.

When the halved structure in which the respective main poles are connected to each other through a thin magnetically saturated magnetic body, according to the third aspect, the assembling can be made easily though the performance of the electric rotating machine is more or less lowered.

BRIEF DESCRIPTION OF THE DRAWINGS

FIGS. 1A and 1B are structural views for explaining Embodiment 1 formed based on the technical thought of the present invention, in which FIG. 1A is a front schematic structural view, and FIG. 1B is a sectional view taken along the line IB—IB in FIG. 1A;

FIGS. 3A and 3B are structural views for explaining Embodiment 2 formed based on the technical thought of the present invention, in which FIG. 3A is a schematic structural front view, and FIG. 3B is a sectional view taken along the line IIIB—IIIB in FIG. 3A;

FIGS. 5A and 5B are structural views for explaining Embodiment 4 formed based on the technical thought of the present invention, in which FIG. 5A is a schematic structural front view, and FIG. 5B is a sectional view taken along the line VB—VB in FIG. 5A;

FIGS. 6A and 6B are structural views for explaining Embodiment 5 formed based on the technical thought of the present invention, in which FIG. 6A is a schematic structural front view, and FIG. 6B is a sectional view taken along the line VIB—VIB in FIG. 6A;

FIGS. 8A and 8B are structural views for explaining a hybrid type permanent-magnet electric rotating machine as an example of a generally-used conventional two-phase permanent-magnet electric rotating machine, in which FIG. 8A is a front schematic structural view, and FIG. 8B is a sectional view taken along the line VIIIB—VIIIB in FIG. 8A.

DETAILED DESCRIPTION OF THE PREFERRED EMBODIMENTS

Embodiments of the present invention will be described below in detail with reference to the drawings.

Embodiment 1

Figure 1A:
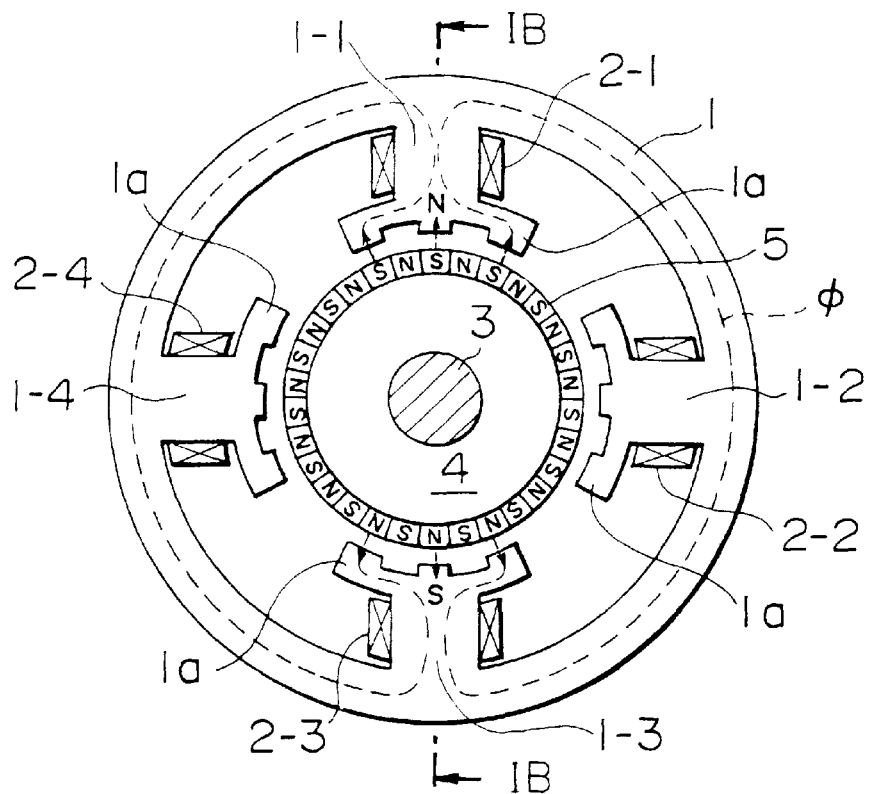

Embodiment 1 shows an example in which the first aspect of the present invention is applied to a two-phase four-pole hybrid type permanent-magnet electric rotating machine described in the prior art. Accordingly, like FIGS. 8A and 8B, the details of a housing, rotor shaft bearings, lead wires of windings, and the like,,are omitted or conceptually simplified. FIG. 1A is a front view of the electric rotating machine, and FIG. 1B is a sectional view taken along the line IB—IB in FIG. 1A.

Figure 1B:
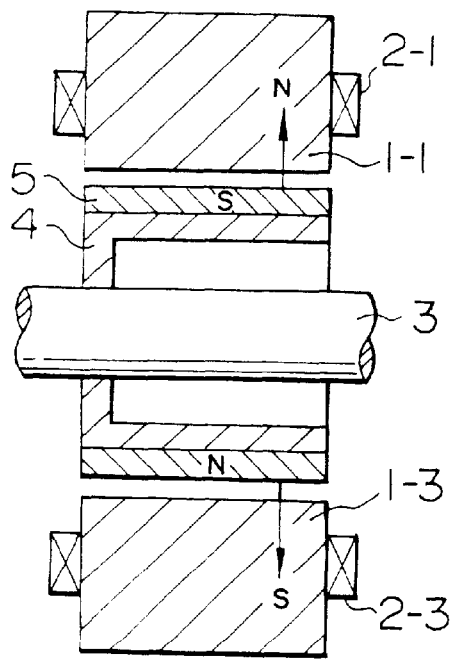

In FIGS. 1A and 1B, the reference numeral 1 designates a stator iron core which is generally formed by laminating a predetermined number of thin magnetic iron plates. The reference numerals 1-1 to 1-4 designate stator main poles formed at circumferentially equal pitches and each having a predetermined number of magnetic teeth formed at its end portion. Excitation windings 2-1 to 2-4 are provided on the main poles 1-1 to 1-4 respectively.

The predetermined number of magnetic teeth $1a$ are formed on the surface of each of the main poles 1-1 to 1-4 of the stator so as to be arranged at circumferentially equal pitches.

The reference numeral 3 designates a rotating shaft rotatably supported by shaft bearings (not shown) provided in the not-shown housing of the electric rotating machine. A cylindrical back yoke 4 formed from a magnetic substance is fitted and attached onto the rotating shaft 3. Permanent magneto of the number corresponding to the pitch of the magnetic teeth formed in the stator are attached onto the cylindrical outer surface of the back yoke 4 so that N and S poles equal in number to each other are arranged in the direction of rotation of the rotating shaft 3.

This embodiment shows the case where the number of the main poles in the stator is 4, that is, the case of n =2 in which the number of the main poles is $2^n$.

Figure 2:
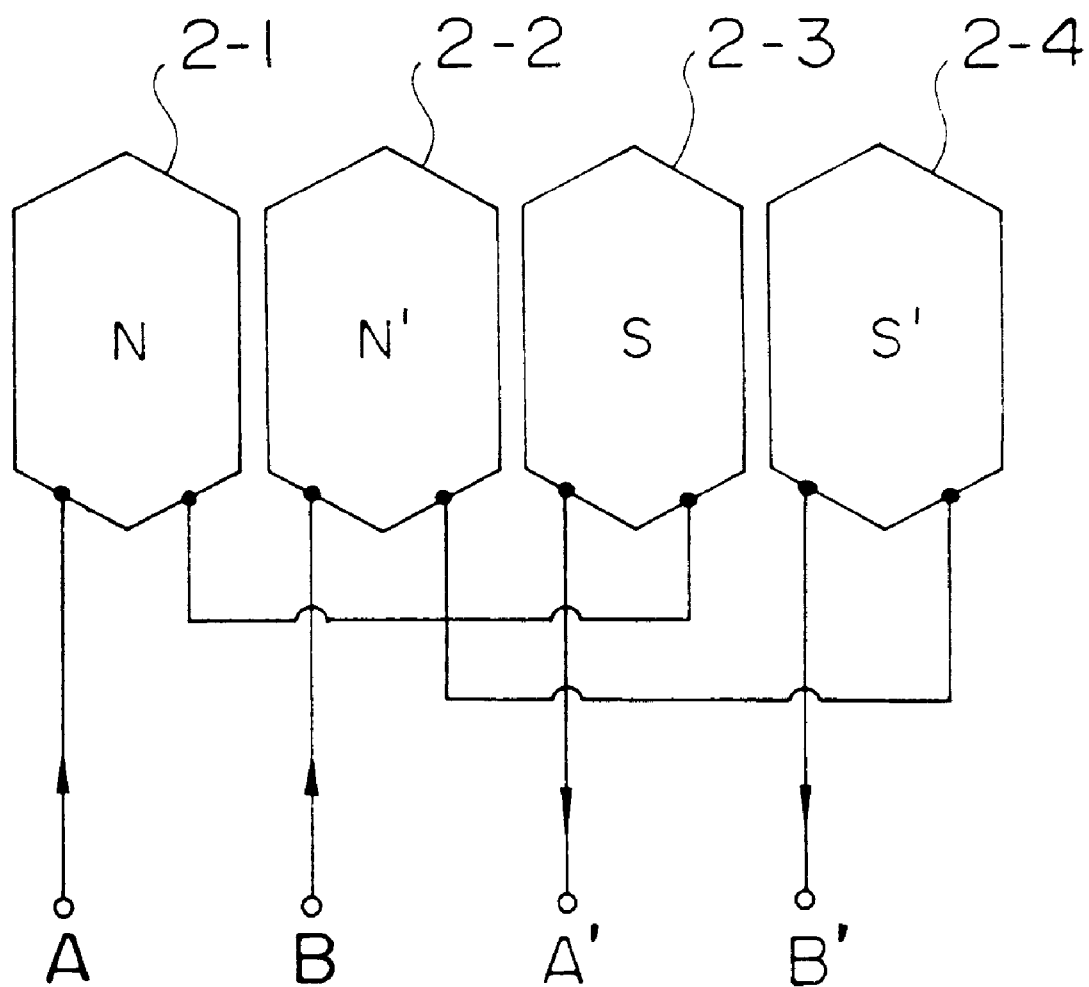
FIG. 2 is a connection view for explaining the excitation characteristic of the excitation windings in Embodiment 1 shown in FIGS. 1A and 1B.

For example, the aforementioned excitation windings are connected in a manner as shown in FIG. 2,.

That is, in FIG. 2, when, for example, a winding terminal A of the electric rotating machine is connected to the start of the winding 2-1, the end of the winding 2-1 is connected to the end of the winding 2-3 and the start of the winding 2-3 is connected to another winding terminal A' of the electric rotating machine. Further, when, for example, a winding terminal B of the electric rotating machine is connected to the start of the winding 2-2, the end of the winding 2-2 is connected to the end of the winding 2-4 and the start of the winding 2-4 is connected to another winding terminal B' of the electric rotating machine.

Accordingly, when, for example, a current is made to pass from the winding terminal A to the winding terminal A', the main pole 1-1 having the winding 2-1 provided thereon is excited to the N pole and the main pole 1-3 having the winding 2-3 provided thereon is excited to the S pole. That is, as shown in FIG. 1A, the main poles 1-1 and 1-3 are excited to the N and S poles respectively so that magnetic flux $\phi$ is formed as represented by the broken line and that attraction force acts symmetrically as represented by the arrows shown in FIGS. 1A and 1B.

When a current is then made to pass from the winding terminal B to the winding terminal B', the main pole 1-2 having the winding 2-2 wound thereon is excited to the N pole (represented by N' in FIG. 2) and the main pole 1-4 having the winding 2-4 wound thereon is excited to the S pole (represented by S' in FIG. 2). That is, the main poles of the stator are formed so that a group of alternate ones of the main poles, that is, $2^{(n-1)}$ alternate main poles become in-phase, while another group of alternate ones of the main poles, that is, the other $2^{(n-1)}$ alternate main poles become in-phase, and that in each in-phase group, the $2^{(n-1)}$ main poles are inverted in polarity alternately.

Although FIG. 2 shows the case where the in-phase windings are connected so as to cross each other, it is a matter of course that the respective windings may be connected so as not to cross each other so long as the respective windings are formed so that magnetic poles appear with those polarities as described above.

In order to obtain a stator iron core 1 having stable characteristic to cancel the influence of the directivity of the magnetic characteristic of magnetic iron plates and the thickness thereof when the stator iron core 1 shown in FIGS. 1A and 1B are formed by laminating such magnetic iron plates, magnetic iron plates having the main poles 1-1 to 1-4 formed into the same shape and at pitches of 90° are preferably laminated while rotated by 90° alternately.

Also in the case where the number of the poles is not 4, magnetic iron plates are preferably laminated while rotated by an angle suitably in accordance with the shape determined on the basis of the number of the poles.

In the electric rotating machine configured as described above, the following equation (1) is satisfied when the number of the permanent-magnet pole pairs formed in the rotor, that is, the number of the rotor pole pairs is Nr.

As is obvious from the equation, each of the left and right sides of the equation (1) shows the step angle of the electric rotating machine.

$$(90°/Nr)=\pm[(360°/4)-(360°/Nr)m] \tag{1}$$

The following equation (2) is obtained by arranging the equation (1).

$$Nr=4m\pm1 \tag{2}$$

FIGS. 1A and 1B shows, by way of example, the case where m=4, that is, Nr=15. In this case, the value of the left side of the equation (1) is 90°/15=6°.

In the case where m=6, Nr=25 is obtained. The value of the left side of the equation (1) is 90°/25=3.6°.

Although the aforementioned embodiment has been described upon the case where a two-phase electric rotating machine has four main poles, that is, the case where n=2, it is apparent by referring to the description that the same function as described above can be obtained even in the case of n>2 if the main poles of the stator are formed so that each group of $2^{(n-1)}$ alternate main poles become in-phase and that in each in-phase group, the main poles are inverted in polarity alternately. Although the above embodiment has been described upon the case where a back yoke is provided in the rotor, permanent magnets may be fixed to a structure which is make from a suitable material and attached to the rotating shaft, or a beck yoke having any shape and any structure other than the aforementioned shape and structure may be formed in accordance with the characteristic and condition required for the electric rotating machine.

Although FIGS. 1A and 1B show an example of the inner-rotor type electric rotating machine, the electric rotating machine may function in the same manner as described above even in the case where the electric rotating machine is formed to be of an outer-rotor type in which the stator and the rotor are formed in the inside and outside, respectively.

Embodiment 2

Embodiment 2 of the second aspect of the present invention in which the stator of the two-phase four-pole permanent-magnet electric rotating machine can be produced by press-cutting one iron plate will be described with reference to FIGS. 3A and 3B. The rotor has a structure similar to that in Embodiment 1, so that parts of this Embodiment 2 the same as or equivalent to those in FIGS. 1A and 1B are referenced correspondingly and the description about them is omitted here for the sake of simplification.

Figure 3A:
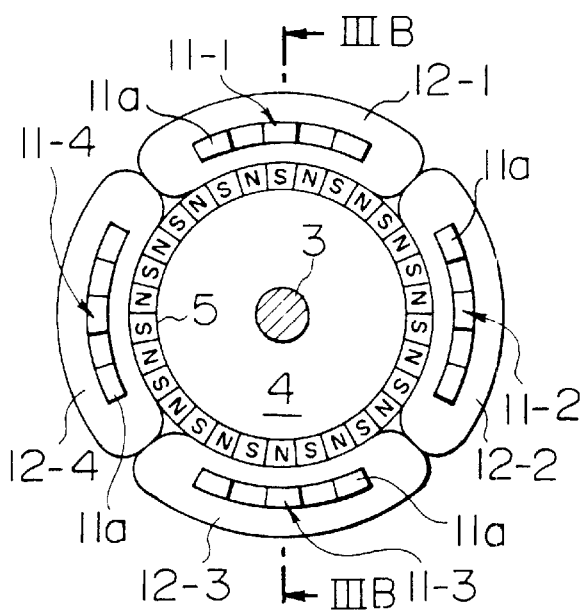
Figure 3B:
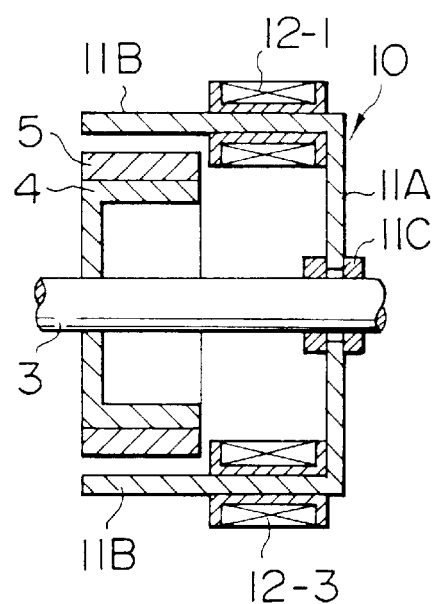

In FIGS. 3A and 3B, the reference numeral 10 designates a stator iron core portion. An iron plate of a predetermined shape is press-cut and then a predetermined number (4 in this embodiment) of main pole portions 11B formed on the circumference of a circular portion 11A are bent perpendicularly to the circular portion 11A. In the main pole portions 11B, at least portions projecting out of the range where excitation windings 12-1 to 12-4 are to be wound are shaped like comb teeth.

Accordingly, in the assembled electric rotating machine, as shown in FIGS. 3A and 3B, there are formed four main poles 11-1 to 11-4 or which excitation windings 12-1 to 12-4 are wound respectively and each of which have a predetermined number of comb-teeth ends 11a.

In the center portion of the circular portion 11A of the stator iron core portion 10, a shaft bearing 11C is attached to support the rotating shaft 3 rotatably. On the rotating shaft 3, a rotor having the same structure as that in Embodiment 1 is provided.

Accordingly, the comb-teeth ends 11a of the respective main poles 11-1 to 11-4 are formed so as to be parallel and opposite to the permanent magnets 5 of the rotor with a predetermined of a gap therebetween.

Accordingly, also in this embodiment, if a current is supplied to the electric rotating machine by using a circuit corresponding to the circuit of FIG. 2 used in the Embodiment 1, the electric rotating machine shown in FIGS. 3A and 3B rotates and stops with a step angle determined on the basis of the number Nr of the permanent-magnet pole pairs formed in the rotor in accordance with the equations (1) and (2).

That is, in the aforementioned configuration, when the electric rotating machine comprises a stator having main poles concentrically formed so that n is not smaller than 2, and a rotor having permanent magnets consisting of equal numbers of N and S poles alternately formed in the direction of rotation and supported rotatably with a predetermined air gap provided so as to be opposite to comb-teeth portions formed in the stator, $2^{(n-1)}$ alternate main poles of the stator become in-phase and in each in-phase group the main poles are inverted in polarity alternately to thereby obtain the performance of the two-phase permanent-magnet electric rotating machine. It is further apparent from the drawings that magnetic forces parallel to and symmetric with each other are generated between the stator and the rotor.

Accordingly, Embodiment 2 functions in the same manner as in Embodiment 1.

The main pole portions 11B and the circular portion 11A are not always necessary to be in one part but they may be formed in parts which are then integrated desirably in accordance with the processing characteristic and necessary performance.

Embodiment 3

Embodiment 2 shows an inner-rotor type electric rotating machine whereas Embodiment 3 shows an outer-rotor type electric rotating machine having a shape similar to that of Embodiment 2. Accordingly, in FIG. 4 for explaining Embodiment 3, parts the same as or Equivalent to those in FIGS. 3A and 3B are referenced correspondingly and the detailed description of those parts is omitted.

Figure 4:
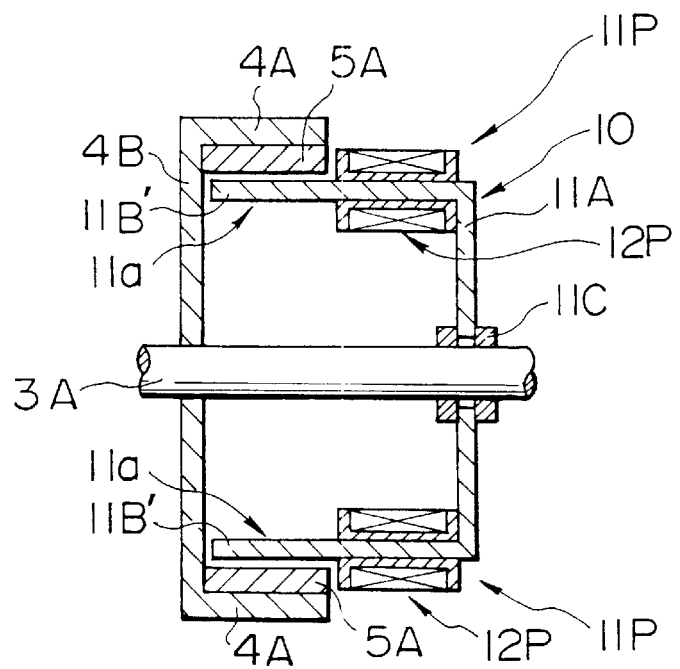
FIG. 4 is a structural view for explaining Embodiment 3 formed based or the technical thought of the present invention, FIG. 4 being a side sectional view corresponding to FIG. 3B.

FIG. 4 is a transverse sectional view shown so as to correspond to FIG. 3B which explains Embodiment 2. In FIG. 4, the reference numeral 11P designates main pole portions of a stator iron core; and 12P, excitation windings provided on the main pole portions 11P of the stator iron core, respectively.

That is, the reference numeral 11P represents a main pole portion in which a predetermined number of main poles 11B' are formed by perpendicularly bending at the circumference of the circular portion 11A of the stator iron core 10. In the main pole portion 11P, the top ends 11a of the respective main poles 11B' beyond the range in which the excitation windings 12P are wound are formed like comb teeth.

Further, a cylindrical back yoke 4A formed from a magnetic substance is mounted at its disk portion 4B onto the rotating shaft 3A which is rotatably supported by a not-shown shaft bearing provided on the housing of the electric rotating machine (also not shown) and the shaft bearing 11C attached to the circular portion 11A of the stator iron core 10. In the cylindrical inner surface of the back yoke 4B, permanent magnets 5A of the number corresponding to the pitch of the comb teeth formed in the stator are attached so that N and S poles which are equal in number are alternately arranged so as to extend in the direction of rotation of the rotating shaft 3A.

That is, the permanent magnets 5A form a cylindrical rotor which rotates in the outside of the stator. Accordingly, Embodiment 3 functions in the same manner as in Embodiment 2.

Embodiment 4

Embodiment 4 of the electric rotating machine according to the third aspect of the present invention in which comb teeth are formed in each of main poles similarly to a claw pole type electric rotating machine, and in which the phase arrangement of the main poles is made in the direction of rotation of the rotating shaft will be described with reference to FIGS. 5A and 5B.

Figure 5A:
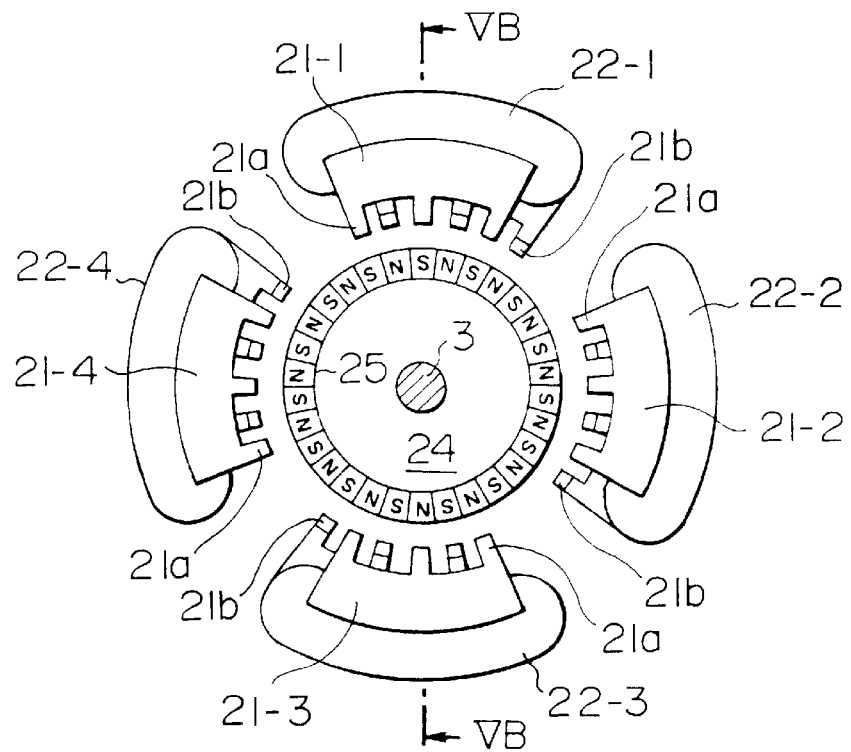
Figure 5B:
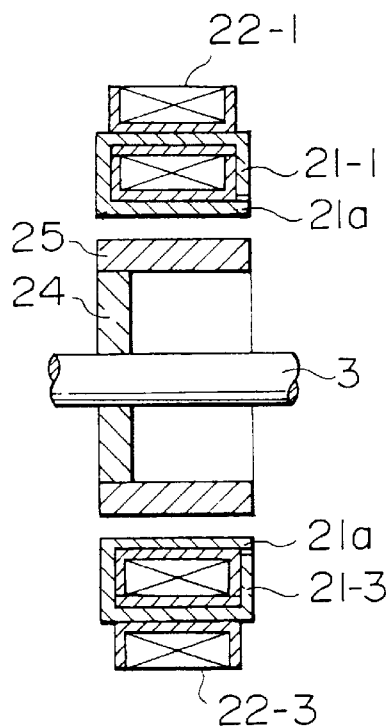

In FIGS. 5A and 5B, specifically, the reference numerals 21-1 to 21-4 designate stator main poles which are formed in such a manner as follows. A magnetic iron plate is bent in the axial direction of a rotating shaft 3 so as to have a predetermined number of comb teeth 21a which are arranged equidistantly in the direction of rotation of the rotating shaft 3, and another magnetic iron plate is bent in the axial direction of the rotating shaft 3 but opposite to the bent direction of first-mentioned magnetic iron plate so as to have a predetermined number of comb teeth 21b which are arranged equidistantly in the direction of rotation of the rotating shaft 3. Then, the pair of magnetic iron plates having the comb teeth 21a and 21b respectively are engaged with each other from the opposite sides in the axial direction of the rotating shaft 3 so that the comb teeth 21a and the comb teeth 21b have predetermined gaps therebetween in the direction of rotation of the rotating shaft 3 in the form of a claw pole configuration as seen in FIGS. 5A and 5B to thereby form each of the main poles 21-1 to 21-4.

At this time, for example, the pair of magnetic iron plates constituting the main pole 21-1 are fitted into the excitation winding 22-1 from the opposite sides in the axial direction of the rotating shaft 3. The other main poles 21-2 to 21-4 are formed in the same manner as the main pole 21-1. The main poles 21-1 to 21-4 are fixed with each other, for example, by means of a non-magnetic body (not shown) so that the main poles 21-1 to 21-4 are arranged around the rotating shaft 3 and at intervals of 90° in the direction of rotation of the rotating shaft 3.

By such a configuration of the windings and current supply circuits, similarly to the Embodiments 1 and 2, alternate ones of the mail poles become in-phase. That is, the main poles 21-1 and 21-3 become in-phase, while the main poles 21-2 and 21-4 become in-phase.

The rotating shaft 3 is rotatably supported by shaft bearings (not shown) provided in the housing (not shown) of the electric rotating machine. A circular structure 24 having a predetermined diameter and formed from a predetermined material is attached on the rotating shaft 3. Permanent magnets 25 of the number corresponding to the pitch of the comb teeth formed in the stator are attached cylindrically on the outer circumferential end portion of the circular structure 24 so that N and S poles equal in number are arranged alternately in the direction of rotation of the rotating shaft 3.

Accordingly, by the connection and current supply in the same manner as those for the windings in an exciter, magnetic flux generated in a main pole enters from its comb teeth formed parallelly to the permanent magnets 25 into magnetic poles of the permanent magnet 25 of the rotor to which the comb teeth of the main pole are facing and then returns to comb teeth of the same main pole adjacent to the aforementioned comb teeth from different magnetic poles adjacent to the aforementioned magnetic poles.

That is, in the aforementioned structure, assume that the electric rotating machine comprises a stator having n main poles (n is not smaller than 2) provided concentrically with the rotating shaft 3, and a rotor which has permanent magnets with N and S poles equal in number formed alternately in the direction of rotation of the rotating shaft 3 and which is supported rotatably with predetermined air gaps between the N and S poles and the opposing comb teeth portions of the main poles of the stator. Then, the n main poles of the stator are arranged so that $2^{(n-1)}$ alternate main poles become in-phase, and if a half of the in-phase main poles are made to be different in polarity from the other half, for example, in FIG. 5A, the coils 22-1 and 22-3 are in-phase so that the same current flows these coils. At this time, accordingly, the main poles 21-1 and 21-3 are excited to have such polarities that the comb teeth 21a and 21b of the main pole 21-1 become N-pole and S-pole respectively, while the comb teeth 21a and 21b of the main pole 21-3 become S-pole and N-pole respectively, thereby attracting the permanent magnets 25 constituting the rotor. Thus, it is possible to obtain the performance of the two-phase permanent-magnet electric rotating machine. Further, magnetic forces generated between the stator and the rotor are parallel and symmetric with each other.

Although the above description has been made upon the case where permanent magnets are attached to the circular structure 24 at its outer circumferential end portion, the circular structure 24 may be formed into a shape similar to the back yoke 4 shown in FIGS. 1A and 1B so that the permanent magnets are provided on such a back yoke.

Embodiment 5

The main structure of Embodiment 5 is similar to that of Embodiment 4, except the structure of the stator iron core constituting main poles. Accordingly, in FIGS. 6A and 6B for explaining Embodiment 5, parts the same as or equivalent to those in FIGS. 5A and 5B are referenced correspondingly, and the detailed description of functions and operations of those parts are omitted here.

Figure 6A:
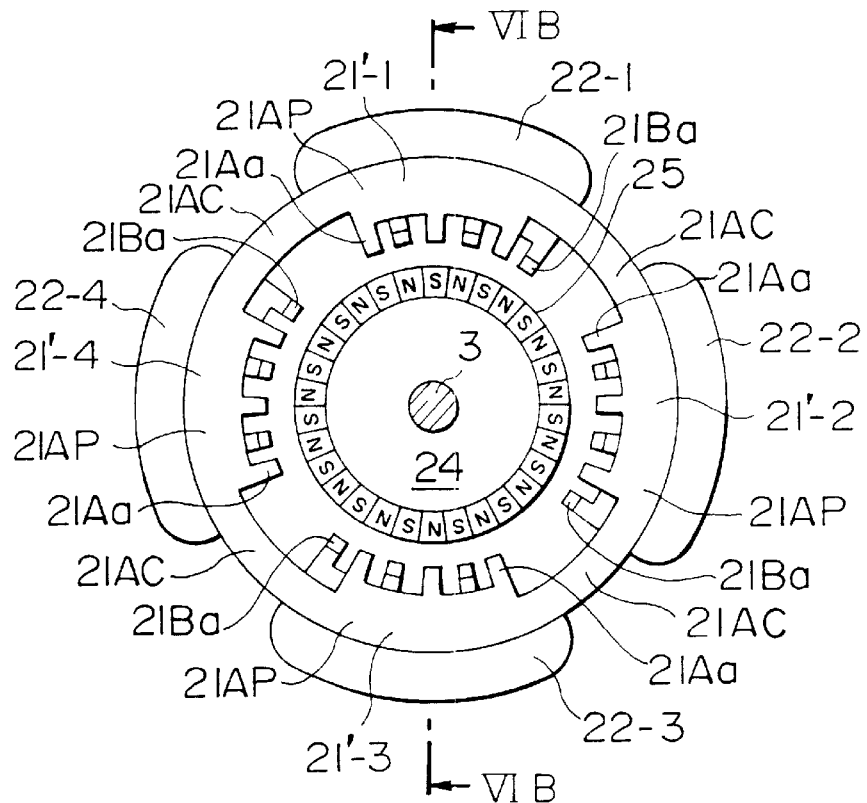
Figure 6B:
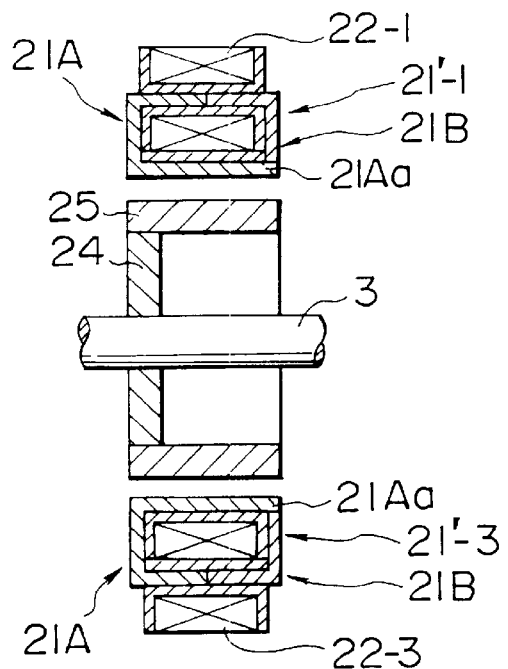

In FIGS. 6A and 6B, a first stator iron core 21A composed of main pole portions 21AP forming a predetermined number (four in this embodiment) of main poles, and connection portions 21AC connecting the main pole portions 21AP, and a second stator iron core 21B having substantially the same shape as the first stator iron core 21A are disposed so as to be magnetically coupled with each other in the respective windings 22-1 to 22-4 while partly covering the respective windings 22-1 to 22-4 to thereby form a stator of an electric rotating machine having a shape similar to that of Embodiment 4.

That is, in each of the main pole portions, a comb teeth portion having a predetermined number of comb teeth 21Aa formed at an inner circumferential end portion of the first stator iron core 21A in a predetermined position thereof and another comb teeth portion having a predetermined number of comb teeth 21Ba formed at an inner circumferential end portion of the second stator iron core 21B in a predetermined position thereof are engaged with each other with a predetermined gap therebetween in the direction of rotation of the rotating shaft 3 from the opposite sides in the axial direction of the rotating shaft 3 to thereby form a shape similar to the shape of each of the main poles of Embodiment 4.

Thus, the main poles 21'-1 to 21'-4 having a shape similar to that of Embodiment 4 are formed.

Incidentally, in this embodiment, as shown in FIGS. 6A and 6B, there is provided a halved core structure in which the comb teeth 21Aa of the respective main pole portions 21AP are connected through magnetically saturated thin connection portions 21AC to form a united body, and similarly to this, the comb teeth 21Ba of the respective main pole portions 21BP (not shown) are connected through similar thin connection portions 21BC (not shown) to form a united body, so that the main pole portions wound with the excitation windings 22-1 to 22-4 are coupled with each other magnetically.

Further, by such a configuration of the windings and a current supply circuit in the same manner as in Embodiments 1 and 2, the main poles become in-phase alternately. That is, the main poles 21-1 and 21-3 become in-shape and the main poles 21-2 and 21-4 become in-phase. In this case, because the respective comb teeth 21Aa and 21Ba are different in polarity from each other structurally, the polarities of the main poles, for example, 21-1 and 21-3, may be made to have the same relation as that in Embodiment 4 of FIG. 5A.

With respect to the shape of the first stator iron core 21A and the shape of the second stator iron core 21B, the relations between the main pole portions and the connection portions, or the like, may be formed suitably taking into account the processing characteristic in accordance with the required characteristic and shape of the electric rotating machine. For example, the first and second stator iron cores 21A and 21B may be shaped similarly and connected to each other. The structure of the rotor is the same as that of Embodiment 4. Accordingly, Embodiment 5 functions with the same characteristic as in Embodiment 4.

Embodiment 6

Embodiments 4 and 5 show the case of an inner-rotor type whereas Embodiment 6 shows the case where the electric rotating machine which is formed so as to have a shape similar to those of Embodiments 4 and 5 but which is formed so as to be of an outer-rotor type. Accordingly, in FIG. 7 explaining Embodiment 6, parts the same as or equivalent to those in FIGS. 5A and 5B explaining Embodiment 4 are referenced correspondingly and the detailed description of functions and operations of those parts are omitted.

Figure 7:
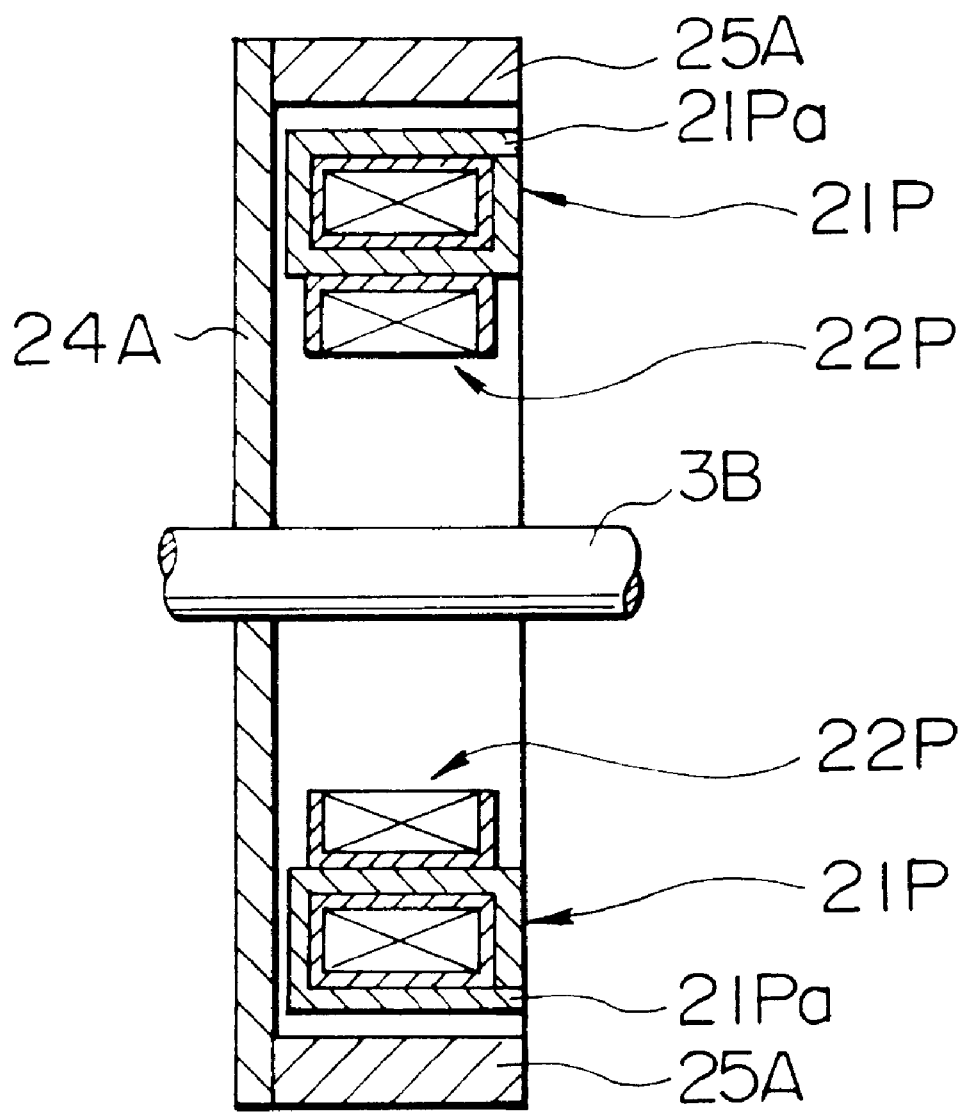
FIG. 7 is a structural view for explaining Embodiment 6 formed based on the technical thought of the present invention, FIG. 7 being a side sectional view corresponding to FIG. 5B.

FIG. 7 is a transverse sectional view corresponding to FIG. 5B which explains Embodiment 4. In FIG. 7, the reference numeral 21P designates main pole portions of a stator iron core; and 22P, excitation windings wound on the main pole portions 21P of the stator iron core, respectively. The main pole portions 21P of the stator iron core are shown to represent four main poles.

The comb teeth portions 21a and 21b of the main poles in Embodiment 4 are formed in the inside of the stator whereas the comb teeth portions 21Pa of the main poles in Embodiment 6 are formed in the outside of the stator. Further, the reference numeral 3B designates a rotating shaft rotatably supported by shaft bearings (not shown) provided on the housing (not shown) of the electric rotating machine. A circular structure 24A of a predetermined material is fixed on the rotating shaft 3B. Permanent magnets 25A of the number corresponding to the pitch of the comb teeth formed in the stator are cylindrically provided on the outer circumferential end portion of the circular structure 24A so as to each extend in the axial direction of the rotating shaft so that N and S poles equal in number are disposed alternately.

That is, the permanent magnets 25A forms a cylindrical rotor which rotates in the outside of the stator.

Accordingly, Embodiment 6 functions in the same manner as Embodiments 4 and 5.

It is a matter of course that the structure of the rotor shown in Embodiments 4 to 6 may be formed with a suitable material and a suitable shape so long as it has predetermined characteristic and strength when the permanent magnets are provided thereon.

Embodiment 7

Though the drawing and detailed description are omitted, when the aforementioned Embodiments 5 and 6 are combined to provide an outer-rotor type structure in which main pole portions are coupled through magnetically saturated connection portions, substantially the same function and characteristic as those of Embodiment 5 or 6 are obtained.

Although the above description of the various embodiments have been made upon several examples of the form for realizing the technical thought of the present invention, it is a matter of course that applications and changes may be made suitably in accordance with the purpose of use of the electric rotating machine, the characteristic and structure suited to the purpose, the condition therefor, etc.

When, for example, the number of the main poles in the above-mentioned electric rotating machine is set to be $2^2$, that is, 4 as the minimum value, the electric rotating machine is most excellent in cost performance and has an advantage to obtain the high torque. The larger the number of the main poles is made, the lower vibration becomes. Accordingly, the number of the poles, the structure of main poles, and so on, are preferably set in accordance with the required functions so that an appropriate structure may be selected in accordance with the condition of the main poles, the environmental condition for attachment thereof, and so on.

With respect to the structure of the stator and rotor and the method of production thereof, the stator and rotor may be formed by any suitable means so long as a required shape is obtained.

Although, in the description of the outer-rotor type, the size of the stator is shown as a size similar to that of the inner-rotor type, it is a matter of course that the sectional area of each winding, or the like, may be changed to an area of a small radius in an allowable range in accordance with the required characteristic of the electric rotating machine.

The two-phase permanent-magnet electric rotating machine according to the present invention is configured and operated as described above with the following excellent effects.

(1) Because the attraction forces of the magnetic poles formed in the main poles and acting on the magnetic poles of the rotor are equal in degree but reverse in direction and canceled with each other in a plane perpendicular to the rotating shaft, no imbalance electromagnetic force is generated.

(2) Accordingly, vibration and noise which are generated in the prior art are not generated.

(3) Because of a simple structure, the electric rotating machine can be produced at a low cost.

(4) Because the surface of the rotor can be formed smoothly to eliminate such projecting teeth as in the hybrid type, air gaps between the rotor and the main poles of the stator are made uniform so that the magnetic flux density distribution can approach a sinusoidal wave. Accordingly, there is an advantage in reduction of vibration/noise.

Figure 8A:
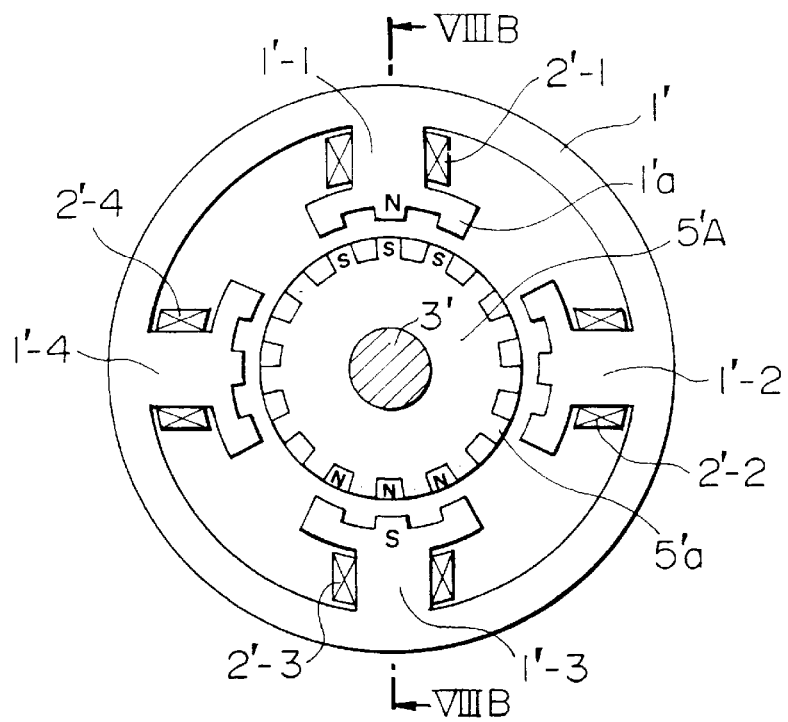
Figure 8B:
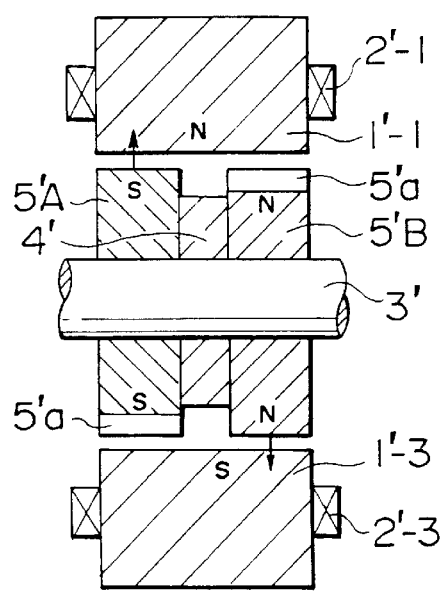

(5) Because the opposing area between the stator and the rotor is increased by twice as much as that of the hybrid type (in the hybrid type, N and S poles of the rotor are formed so as to be shifted by ½ as shown in FIGS. 8A and 8B, so that the opposing area between the stator and the rotor is halved in the axial direction), there is an advantage in increase of torque. (6) Because polarities opposite to each other are generated in the main poles of the stator opposite to each other by 180° so that the magnetic poles formed in each of the main poles attract the magnetic poles of the rotor when the number of the main poles is set to be $2^2$ and the number of the pole pairs of the rotor is set to be 4m±1 (m is an integer satisfying m≧1), the respective attraction forces are equal in degree but reverse in direction and canceled with each other in a plane perpendicular to the rotating shaft. Accordingly, no imbalance electromagnetic force is generated.

(7) Accordingly, vibration and noise which are generated in the prior art are not generated even in the case where the two-phase electric rotating machine is formed with the minimum number of main poles, that is, with four main poles.

(8) Because the magnetic reluctance of the magnetic circuit can be reduced when a back yoke formed from a magnetic substance is provided in the inner side of the permanent magnets formed in the rotor, efficiency is improved.

(9) According to the second aspect of the invention composed of a disc portion, and main poles erected perpendicularly from the outer circumference of the disc portion at circumferentially equal pitches, reduction of the processing cost can be achieved because this structure can be formed only by press-cutting one iron plate.

(10) Because the main poles are formed by being erected perpendicularly from the outer circumference of a disc portion at circumferentially equal pitches, a stator iron core can be constituted by only one part to thereby achieve cost reduction.

(11) According to the third aspect of the invention, comb teeth portions are formed in pair for each main pole and the comb teeth portions in pair for each main pole are engaged with each other from the opposite sides in the axial direction of the rotating shaft at a predetermined gap therebetween in the direction of rotation of the rotating shaft, so that the magnetic circuit is uniform and high in efficiency and the resulting electric rotating machine generates less vibrations and noise.

(12) When a halved structure in which main poles are connected through a thin magnetically saturated magnetic substance is applied to the aforementioned structure, assembling can be made easily with the structure in which the magnetic coupling between adjacent main poles is prevented to thereby avoid deterioration of the performance.

(13) When such a structure as stated in the above item (11) is applied to an electric rotating machine of the outer-rotor type, the stator portion inclusive windings can be formed in the inside of the rotor. Accordingly, reduction in size and thickness can be achieved.

What is claimed is:

1. A two-phase permanent-magnet electric rotating machine comprising: a stator having $2^n$ main poles (n being 2 or 3) provided circumferentially so as to project inward centripetally from an inner circumferential surface of a substantially annular magnetic body, said stator having exciting windings wound on said main poles respectively, each of said main poles having on its end portion a predetermined number of magnetic teeth; and a cylindrical rotor having a plurality of permanent magnets formed in a manner so that N (north) and S (south) poles equal in number of said permanent magnets and equal to (n−1) (4m±1) (m being an integer satisfying a condition m≧2) are adjacent and continuously alternately circumferentially disposed on a back yoke formed from a magnetic substance, said permanent magnets having a circumferential polar direction between said N and S poles, said rotor being supported so as to be rotatable relative to said stator with a predetermined air gap between surfaces of said main poles and surfaces of said permanent magnets, wherein said magnetic teeth and said permanent magnets face each other circumferentially side by side in a plane perpendicular to the axial direction to generate magnetic flux only in the circumferential and radial directions; wherein said main poles are arranged in a manner so that $2^{(n-1)}$ alternate ones of said main poles are made to be in-phase and that a half of said in-phase main poles have a polarity. which is opposite to a polarity of the other half of said in-phase main poles.

2. A two-phase permanent-magnet electric rotating machine according to claim 1, wherein the value of n of said $2^n$ main poles is 2 and the number of the magnetic pole pairs of N and S of said rotor is 4m±1 (m being an integer satisfying a condition m≧2).

3. A two-phase permanent-magnet electric rotating machine according to claim 1 or 2, wherein said windings and connections thereof are formed in a manner so that the in-phase main poles of said stator are made alternately different from each other in polarity.

4. A two-phase permanent-magnet electric rotating machine comprising: a stator having $2^n$ main poles (n being 2 or 3) provided circumferentially at equal pitches so as to project inward centripetally from an inner circumferential surface of a substantially annular magnetic body, said stator having exciting windings wound on said main poles respectively, each of said main poles having on its end portion a predetermined number of magnetic teeth; and a cylindrical rotor having a plurality of permanent magnets formed in a manner so that N (north) and S (south) poles equal in number of said permanent magnets are adjacent and disposed continuously and alternately in a direction of rotation of said rotor on a back yoke formed from a magnetic substance said permanent magnets having a circumferential polar direction between said N and S poles, said rotor being supported so as to be rotatable relative to said stator with a predetermined air gap between surfaces of said main poles and surfaces of said permanent magnets; wherein said main poles are arranged in a manner so that $2^{(n-1)}$ alternate ones of said main poles are made to be in-phase and that a half of said in-phase main poles have a polarity which is opposite to a polarity of the other half of said in-phase main poles, and wherein the number of the magnetic pole pairs of N and S of said rotor is (n−1)(4m±1) (m being an integer satisfying a condition m≧1).

* * * * *